United States Patent [19]

Stormont

[11] Patent Number: 4,753,123
[45] Date of Patent: Jun. 28, 1988

[54] AUTOMATIC SELF ADJUSTING CABLE CONTROL DEVICE

[75] Inventor: James D. Stormont, Grass Lake, Mich.

[73] Assignee: Babcock Industries Inc., Fairfield, Conn.

[21] Appl. No.: 108,483

[22] Filed: Oct. 14, 1987

[51] Int. Cl.[4] .................. F16C 1/10; F16D 11/00; F16D 13/60; F16D 65/38

[52] U.S. Cl. .................. 74/501 R; 74/501.5 R; 192/111 A; 192/30 W; 192/70.25; 188/136 B; 188/136 R

[58] Field of Search ....... 74/501 R, 501.5 R, 501.5 H, 74/502, 503; 192/111 A, 30 W, 70.25; 188/196 B, 196 R, 265, 2 D; 340/52 R, 52 B

[56] References Cited

U.S. PATENT DOCUMENTS

| 3,809,189 | 5/1974 | Farr | 192/111 A |
|---|---|---|---|
| 3,942,827 | 3/1976 | Warlop et al. | 188/196 BA |
| 4,109,773 | 8/1978 | Higgerson et al. | 192/111 A |
| 4,344,518 | 8/1982 | Gilmore | 192/111 A |
| 4,399,894 | 8/1983 | Tribe | 188/196 BA |
| 4,543,849 | 10/1985 | Yamamoto et al. | 74/501.5 R |
| 4,598,809 | 7/1986 | Glover et al. | 192/111 A |
| 4,651,852 | 3/1987 | Wickham et al. | 192/111 A |
| 4,669,330 | 6/1987 | Stocker | 74/501.5 R |
| 4,690,262 | 9/1987 | Hoyle | 192/111 A |
| 4,693,137 | 9/1987 | Deligny | 74/501.5 R |

FOREIGN PATENT DOCUMENTS

| 2910421 | 9/1979 | Fed. Rep. of Germany | 192/111 A |
|---|---|---|---|
| 934081 | 8/1963 | United Kingdom | 188/196 BA |
| 1068173 | 5/1967 | United Kingdom | 188/196 BA |
| 2088501 | 6/1982 | United Kingdom | 188/196 BA |

Primary Examiner—Gary L. Smith
Assistant Examiner—Vinh Luong
Attorney, Agent, or Firm—Barnes, Kisselle, Raisch, Choate, Whittemore & Hulbert

[57] ABSTRACT

An automatic self-adjusting cable control device comprising an outer member, an inner member having longitudinally spaced serrations, a spring yieldingly urging the inner member in one direction relative to the outer member, a clutch mechanism between the outer member and the inner member operable to adjust the position of the inner member depending upon the forces applied to the inner and outer members, respectively, and a mechanism for locking the inner member relative to the outer member comprising a first member fixed on the outer member and having an opening through which the inner member extends, a second member rotatably mounted on the first member about an axis spaced radially from the axis of the first member and having an opening through which the inner member extends. The opening through the second member is positioned so that in one rotatable position of the second member relative to the first member, the opening of the second member is aligned with the opening in the first member. In another position of the second member, the opening is out of alignment with the opening in the first member. The second member has an array of serrations on a portion of the opening therethrough. When the second member is rotated to one position, the array of serrations on the second member is out of engagement with the serrations on the inner member, and when the second member is rotated to a second position, the array of serrations is in engagement with the serrations of the inner member.

19 Claims, 2 Drawing Sheets

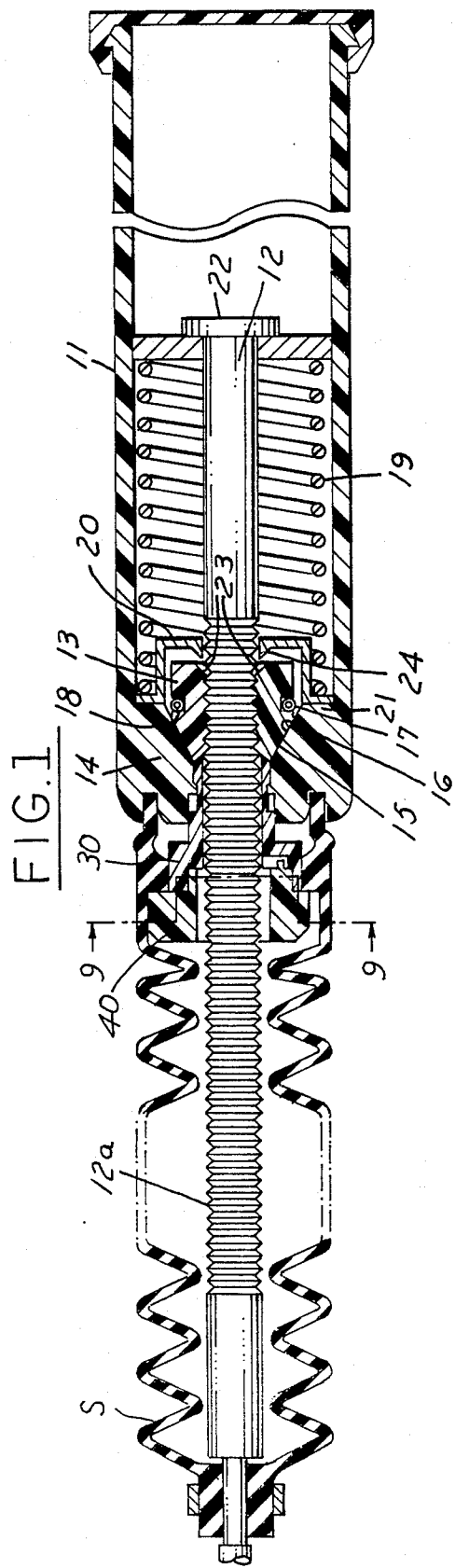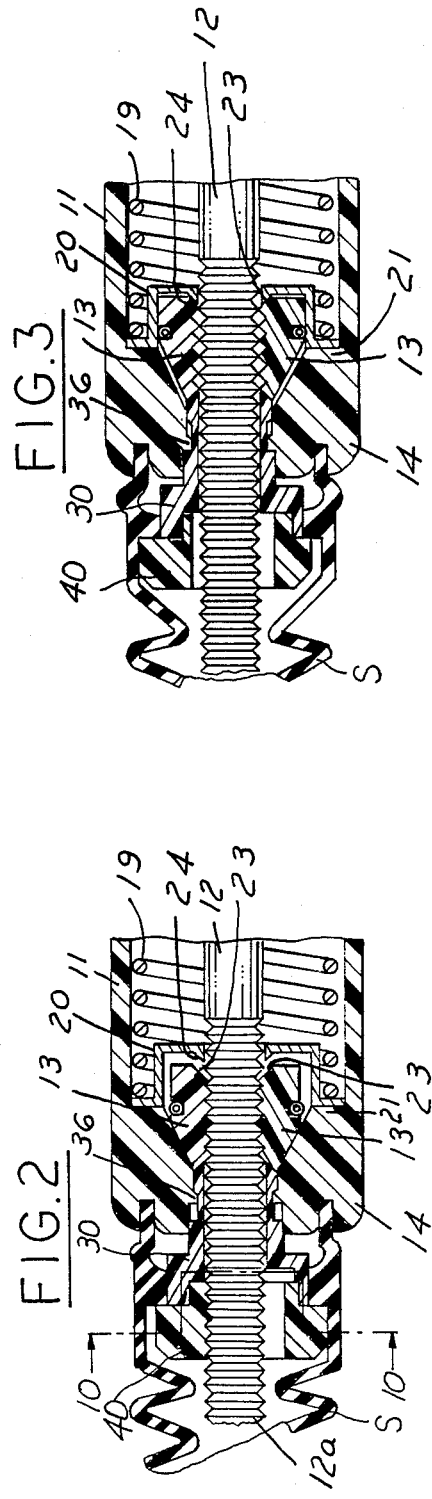

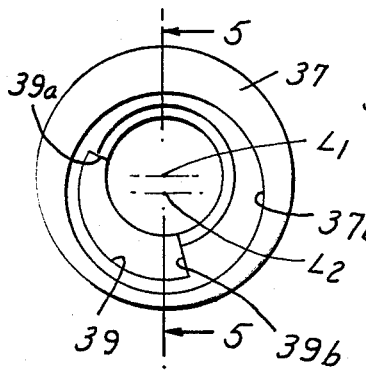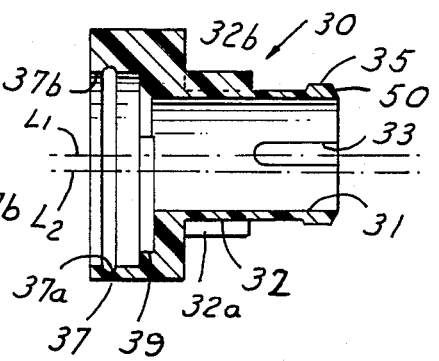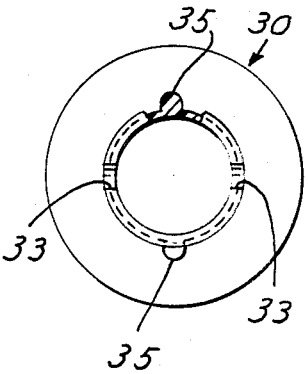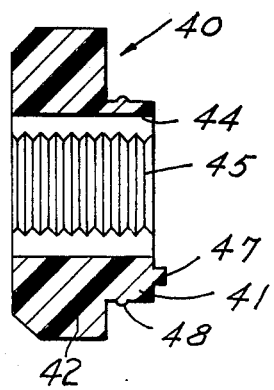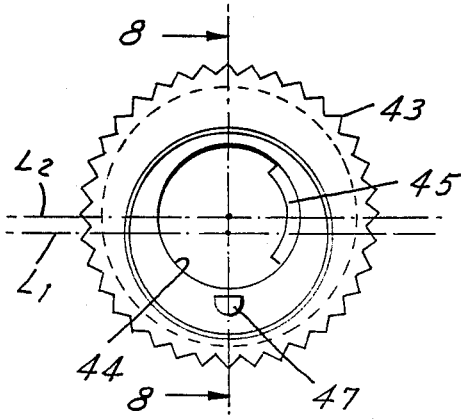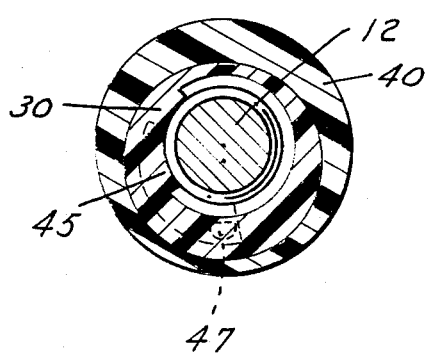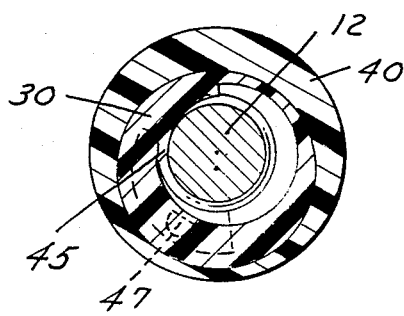

AUTOMATIC SELF ADJUSTING CABLE CONTROL DEVICE

This invention relates to self-adjusting cable control systems which automatically compensate for wear of a control system to insure that proper tension and tolerances are maintained in the system.

BACKGROUND AND SUMMARY OF THE INVENTION

In cable control systems that are utilized, for example, in automobiles for operation of brakes, clutches and transmissions, it is common to use a flexible control cable comprising an outer conduit member and an inner core member. When such systems are placed in position, manufacturing tolerances require that the systems be initially adjusted. However, in the handling of the automatic self-adjusting control devices associated with such systems, it is desirable to lock the position of the elements of the device until it is in position.

Automatic self-adjusting cable control devices of the type which the invention relates are shown, for example, in U.S. Pat. No. 4,378,713 and U.S. application Ser. No. 832,526 filed Feb. 21, 1986 and U.S. application Ser. No. 917,914 filed Oct. 10, 1986.

Such systems conventionally utilize an outer member and an inner member which are yieldingly urged in one direction relative to one another and a clutch mechanism between the outer member and the inner member operable to automatically adjust the length and thus the tension of the cable system when the force exceeds a predetermined value.

In aforementioned patent applications, incorporated herein by reference, means are provided for locking the automatic self-adjusting device during transportation and installation and comprises a clip which functions to engage the inner member and hold it in fixed longitudinal position relative to the outer member.

Among the objectives of the present invention are to provide a cable control device which has an effective, inexpensive mechanism for locking the outer member relative to the inner member and releasing the outer member relative to the inner member as may be desired; which is simple in construction and low in cost; and which also incorporates a construction for releasing the clutch mechanism as may be desired for manual adjustment.

In accordance with the invention, the automatic self-adjusting cable control device comprises an outer member, an inner member having longitudinally spaced serrations, a spring yieldingly urging the inner member in one direction relative to the outer member, and a clutch mechanism between the outer member and the inner member operable to adjust the position of the inner member depending upon the forces applied to the inner and outer members, respectively, and a mechanism for locking the inner member relative to the outer member comprising a first member fixed on the outer member and having an opening through which the inner member extends, a second member rotatably mounted on the first member about an axis spaced radially from the axis of the first member and having an opening through which the inner member extends. The opening through the second member is positioned so that in one rotatable position of the second member relative to the first member, the opening of the second member is aligned with the opening in the first member. In another position of the second member, the opening is out of alignment with the opening in the first member. The second member has an array of serrations on a portion of the opening therethrough. When the second member is rotated to one position, the array of serrations on the second member is out of engagement with the serrations on the inner member, and when the second member is rotated to a second position, the array of serrations is in engagement with the serrations of the inner member.

DESCRIPTION OF THE DRAWINGS

FIG. 1 is a longitudinal sectional view of a device embodying the invention.

FIG. 2 is a fragmentary sectional view of a portion of the system shown in FIG. 1 showing the device in a different operative position.

FIG. 3 is a view similar to FIG. 2 showing the device in a still further operative position.

FIG. 4 is an end view of an element utilized in the device.

FIG. 5 is a sectional view taken along the line 5—5 in FIG. 4.

FIG. 6 is a part sectional end view taken from the right as viewed in FIG. 5.

FIG. 7 is an end view of another element in the system.

FIG. 8 is a sectional view taken along the line 8—8 in FIG. 7.

FIG. 9 is a sectional view taken along the line 9—9 in FIG. 1, parts being broken away.

FIG. 10 is a sectional view taken along the line 10—10 in FIG. 2.

DESCRIPTION

Referring to FIGS. 1–3, the self-adjusting cable control device embodying the invention is adapted to be interposed between brake cables not shown. The device comprises an outer plastic member in the form of a tubular housing 11. Outer member 11 is adapted to be connected as by a core or cable to an activating member such as a clutch or brake. An inner member 12 in the form of a rod extends through an opening in the outer member 11 and is connected to another core or cable in any suitable manner such as a conventional attaching clip.

A clutch is provided between the inner and outer members and includes plastic collet members 13 positioned about the inner member 12 within the tubular portion 14 of outer member 11. The collet members 13 have external conical surfaces 15 at one end adapted to engage a complementary internal conical surface 16 on the portion 14. A circular retaining spring 17 extends circumferentially in aligned grooves 18 in each collet member 14 to yieldingly urge the collet members 14 toward the inner member 12. A helical spring 19 is interposed between a bracket 20 which engages a shoulder 21 on the portion 14 and a washer 22 fixed on the end of the inner member 12 yieldingly urging the inner member 12 inwardly of the housing 10 and to the right as seen in FIG. 1. As shown in FIG. 1, the collet members 14 include an internal conical surface 23 at the end thereof opposite the end having surfaces 15. Surfaces 23 are complementary to an external generally frustoconical surface 24 on the bracket 20. The interengagement of the internal conical surface 23 and external conical surface 15 of the collet members 13 with the external surfaces 24 of the bracket 20 and internal surface 16 of member 11 is such that the collet members 14 disengage over the complete length of the serrations when slack occurs.

When an adjustment needs to occur because of slack, the spring 19 urges the member 12 to the right causing surfaces 23 on the collet members 14 to engage the surface 24 on bracket 20. This, in combination with the normal component of force acting on teeth 14a on collet members which normally engage teeth 12a on member 12, forces the collet members 14 to move radially outwardly disengaging the teeth 12a, 14a until the slack is removed and the teeth re-engage.

In accordance with the invention, locking means are provided for locking the outer member 11 relative to the inner member 12 and comprises a first plastic member 30 which has an opening 31 extending longitudinally in a tubular portion 32 thereof formed with slots 33. An annular rib 35 is adapted to be snapped into position past an annular rib 36 on the outer member 11 to lock the first member against axial relative outward movement with respect to the outer member. Spaced ribs 32a engage longitudinally extending grooves 32b on the outer member 11 to prevent relative rotation of the first member 30 relative to the outer member 11 while permitting axially inwardly movement.

As shown in FIGS. 4 and 5, the centerline $L_1$ of the opening 31 is spaced radially from the centerline $L_2$ of the device and the inner member. The opposite end of member 30 has a larger diameter portion 37 having a centerline $L_2$. The portion 37 is formed with a cylindrical opening 37b and an arcuate groove 37a having end shoulders which are engaged by a stop to limit the relative rotation of a second member 40, as presently described.

Referring to FIGS. 7 and 8, the locking means further includes a second plastic inner member 40 having a short tubular portion 41 and enlarged manual gripping portion 42 formed with knurls 43 for grasping the member 40. An opening 44 is concentric with the axis of the inner member 40. An arcuate portion 45 extends radially inwardly from opening 44 and is provided with a longitudinally spaced array of serrations 45 thereon which are adapted to engage serrations 12a on inner member 12. The array of serrations 45 extends circumferentially less than 90°. The member 40 further includes a projection 47 that is adapted to engage an arcuate groove 39 in the first member 30. The tubular portion of member 40 includes an annular rib or bead 48 that snaps into a corresponding interior groove 37a in the wall of an opening 37b in the larger diameter portion 37 of first member 30. The outer diameter of portion 41 of member 40 is equal to the inner diameter of opening 37b of member 30. The member 40 is inserted into member 30 with the projection 47 extending into groove 37a in the member 30.

When the automatic self-adjusting device is in the position in FIG. 1, representative of the normal operation of the device, the opening 31 in the first member 30 and the opening 44 in the second member 40 are concentric and the array of serrations 45 is out of engagement with serrations 12a on the inner member 12. When the second member is rotated to the position shown in FIGS. 2 and 10, the serrations 45 on the second member 40 engage the serrations 12a on the inner member 12 locking the device. It is in this position that the device is shipped and handled for installation on the cable control system, for example, the automobile brake, clutch or transmission systems.

When the cable control device is installed and connected in the automotive vehicle and it is desired to release the device, the worker grasps the knurled gripping portion through the elastic shroud S that encircles it and rotates the second member 40 relative to the first member moving the array of serrations 45 out of engagement with the serrations 12a on the member 12 so that spring 19 applies a force to the member 12 thereby permitting the control device to operate automatically.

Referring to FIG. 5, the locking mechanism also includes a beveled portion 50 on the tubular portion of the first member which is operable to engage a bevel surface on the collet members 14 when it is desired to disengage the collet members 14 from the inner member 12 as may be desired, for example, for adjustment.

It can thus be seen that there has been provided a cable control device which has an effective, inexpensive mechanism for locking the outer member relative to the inner member and releasing the outer member relative to the inner member as may be desired; which is simple in construction and low in cost; and which also incorporates a construction for releasing the clutch mechanism as may be desired for manual adjustment.

I claim:

1. An automatic self-adjusting cable control device comprising
    an outer member,
    an inner member having longitudinally spaced serrations,
    a spring yieldingly urging said inner member in one direction relative to said outer member,
    and a clutch mechanism between said outer member and said inner member operable to engage and disengage the serrations on the inner member to adjust the position of said inner member depending upon the forces applied to said inner and outer members, respectively,
    a mechanism for locking said inner member relative to said outer member comprising a first member fixed on said outer member and having an opening through which said inner member extends comprising
    a second member rotatably mounted on said first member about an axis spaced radially from the axis of said first member and having an opening through which said inner member extends,
    said opening through the second member being positioned so that in one rotatable position of the second member relative to the first member, the opening of the second member is aligned with the opening in the first member, and in another position of the second member, the opening is out of alignment with the opening in the first member,
    said second member having an array of serrations on a portion of the opening therethrough such that when said second member is rotated to one position, the array of serrations on the second member is out of engagement with the serrations on said inner member, and when said second member is rotated to a second position, the array of serrations is in engagement with the serrations of said inner member.

2. The cable control device set forth in claim 1 wherein said second member includes a cylindrical tubular portion having said array of serrations thereon, said first member having a second cylindrical opening concentric with the first mentioned opening in said first member into which said tubular portion extends.

3. The cable control device set forth in claim 2 including a groove in the surface of said second opening of said first member, said tubular portion of said second member including an annular rib engaging said groove.

4. The cable control device set forth in claim 2 wherein said first member includes a tubular portion and interengaging means between said tubular portion of said first member and said outer member for locking the first member against relative axial outward movement with respect to the outer member.

5. The cable control device set forth in claim 4 including interengaging means between the first member and said outer member to prevent relative rotational movement of the first member relative to the outer member while permitting axially inward movement.

6. The cable control device set forth in claim 4 wherein said interengaging means for locking the first member against relative axial outward movement comprises an annular rib on said tubular portion of said first member and a complementary annular rib on said outer member.

7. The cable control device set forth in claim 6 wherein said annular rib on said tubular portion of said first member has a surface for engaging said clutch member when the first member is manually moved axially inwardly to disengage the clutch mechanism from the serrations on said inner member.

8. The cable control device set forth in claim 5 wherein said interengaging means between the first member and said outer member to prevent relative rotational movement comprises circumferentially spaced ribs on said first member and complementary grooves on said outer member.

9. The control device set forth in claim 2 wherein said second member has an enlarged manual gripping portion adapted to be gripped by hand to rotate the second member.

10. An automatic self-adjusting cable control device comprising
an outer member,
an inner member having longitudinally spaced serrations,
a spring yieldingly urging said inner member in one direction relative to said outer member,
and a clutch mechanism between said outer member and said inner member operable to engage and disengage the serrations on the inner member to adjust the position of said inner member depending upon the forces applied to said inner and outer members, respectively,
said clutch mechanism comprising a plurality of circumferentially spaced collets having serrations thereon movable radially toward and away from the serrations on said inner member,
a mechanism for locking said inner member relative to said outer member comprising a first member fixed on said outer member and having an opening through which said inner member extends comprising,
a second member rotatably mounted on said first member about an axis spaced radially from the axis of said first member and having an opening through which said inner member extends,
said opening through the second member being positioned so that in one rotatable position of the second member relative to the first member, the opening of the second member is aligned with the opening in the first member, and in another position of the second member, the opening is out of alignment with the opening in the first member,
said second member having an array of serrations on a portion of the opening therethrough such that when said second member is rotated to one position, the array of serrations on the second member is out of engagement with the serrations on said inner member, and when said second member is rotated to a second position, the array of serrations is in engagement with the serrations of said inner member.

11. The cable control device set forth in claim 10 wherein said second member includes a cylindrical tubular portion having said array of serrations thereon, said first member having a second cylindrical opening concentric with the first mentioned opening in said first member into which said tubular portion extends.

12. The cable control device set forth in claim 11 including a groove in the surface of said second opening of said first member, said tubular portion of said second member including an annular rib engaging said groove.

13. The cable control device set forth in claim 11 wherein said first member includes a tubular portion and interengaging means between said tubular portion of said first member and said outer member for locking the first member against relative axial outward movement with respect to the outer member.

14. The cable control device set forth in claim 13 including interengaging means between the first member and said outer member to prevent relative rotational movement of the first member relative to the outer member while permitting axially inward movement.

15. The cable control device set forth in claim 13 wherein said interengaging means for locking the first member against relative axial outward movement comprises an annular rib on said tubular portion of said first member and a complementary annular rib on said outer member.

16. The cable control device set forth in claim 15 wherein said annular rib on said tubular portion of said first member has a surface for engaging said clutch member when the first member is manually moved axially inwardly to disengage the clutch mechanism from the serrations on said inner member.

17. The cable control device set forth in claim 14 wherein said interengaging means between the first member and said outer member to prevent relative rotational movement comprises circumferentially spaced ribs on said first member and complementary grooves on said outer member.

18. The control device set forth in claim 11 wherein said second member has an enlarged manual gripping portion adapted to be gripped by hand to rotate the second member.

19. An automatic self-adjusting cable control device comprising
an outer member,
an inner member having longitudinally spaced serrations,
a spring yieldingly urging said inner member in one direction relative to said outer member,
and a clutch mechanism between said outer member and said inner member operable to engage and disengage the serrations on the inner member to adjust the position of said inner member depending upon the forces applied to said inner and outer members, respectively, said clutch mechanism comprising a plurality of circumferentially spaced collects having serrations thereon movable radially toward and away from the serrations on said inner member, a mechanism for locking said inner member relative to said outer member comprising a first member fixed on said outer member and having an opening through which said inner member extends comprising, a second member rotatably mounted on said first member about an axis spaced radially from the axis of said first member and having an opening through which said inner member extends, said opening through the second member being positioned so that in one rotatable position of the second member relative to the first member, the opening of the second member is aligned with the opening in the first member, and in another position of the second member, the opening is out of alignment with the opening in the first member, said second member having an array of serrations on a portion of the opening therethrough such that when said second member is rotated to one position, the array of serrations on the second member is out of engagement with the serrations on said inner member, and when said second member is rotated to a second position, the array of serrations is in engagement with the serrations of said inner member, said second member including a cylindrical tubular portion having said array of serrations thereon, said first member having a second cylindrical opening concentric with the first mentioned opening in said first member into which said tubular portion extends, a groove in the surface of said second opening of said first member, said tubular portion of said second member including an annular rib engaging said groove, said first member including a tubular portion and interengaging means between said tubular portion of said first member and said outer member for locking the first member against relative axial outward movement with respect to the outer member, said interengaging means for locking the first member against relative axial outward movement comprising an annular rib on said tubular portion of said first member and a complementary annular rib on said outer member, said annular rib on said tubular portion of said first member having a surface for engaging said clutch member when the first member is manually moved axially inwardly to disengage the clutch mechanism from the serrations on said inner member, interengaging means between the first member and said outer member to prevent relative rotational movement of the first member relative to the outer member while permitting axially inward movement, said interengaging means between the first member and said outer member to prevent relative rotational movement comprising circumferentially spaced ribs on said first member and complementary grooves on said outer member, said second member having an enlarged manual gripping portion adapted to be gripped by hand to rotate the second member.

* * * * *